US005537957A

United States Patent [19]

Gutkin

[11] Patent Number: 5,537,957

[45] Date of Patent: Jul. 23, 1996

[54] INTERNAL COMBUSTION ENGINE

[76] Inventor: Timofei G. Gutkin, 1420 Ocean Pkwy., Brooklyn, N.Y. 11235

[21] Appl. No.: 439,312

[22] Filed: May 11, 1995

Related U.S. Application Data

[63] Continuation-in-part of Ser. No. 168,419, Dec. 17, 1993, abandoned.

[51] Int. Cl.$^{6}$ .................................................. F16H 21/34

[52] U.S. Cl. ...................................... 123/197.1; 123/55.2

[58] Field of Search ............................ 123/197.3, 197.4, 123/53.1, 53.3, 53.5, 55.2, 52.1, 58.1, 65 R, 311, 197.1

[56] References Cited

U.S. PATENT DOCUMENTS

| | | | |
|---|---|---|---|
| 1,340,651 | 5/1920 | Dietrich | 123/53.3 |
| 1,912,604 | 6/1933 | Valentine | 123/53.1 |
| 2,392,921 | 1/1946 | Holman | 123/197.4 |
| 2,822,791 | 2/1958 | Biermann | 123/197.4 |
| 3,633,429 | 1/1972 | Olson | 74/44 |
| 3,693,463 | 9/1972 | Garman | 74/38 |
| 4,433,649 | 2/1984 | Shin | 74/44 |
| 4,437,438 | 3/1984 | Mederer | 123/197.3 |
| 4,979,428 | 12/1990 | Nelson | 92/140 |
| 5,211,065 | 5/1993 | Mandella | 74/51 |
| 5,216,927 | 6/1993 | Mandelia | 74/51 |

*Primary Examiner*—David A. Okonsky
*Attorney, Agent, or Firm*—Ilya Zborovsky

[57] ABSTRACT

An internal combustion engine has a rotatable work shaft, a crank connected with the work shaft, a plurality of cylinders having working chambers, a plurality of pistons movable in the cylinders, and connecting means connecting the pistons with the crank so that a gas pressure in the combustion chambers applied to the pistons is transmitted when a maximum pressure is obtained in the combustion chambers and a maximum lever arm of the crank is obtained so as to provide a maximum torque on the work shaft.

7 Claims, 7 Drawing Sheets

INTERNAL COMBUSTION ENGINE

CROSS REFERENCE TO RELATED APPLICATION

This application is a continuation-in-part of application Ser. No. 168 419, filed Dec. 17,1993, now abandoned.

BACKGROUND OF THE INVENTION

The present invention relates to a heat-and-power engine and can be used for producing superefficient internal combustion engines for direct conversion of thermal energy into mechanical energy of a rotary work shaft.

It is known to convert thermal energy produced during fuel combustion into mechanical energy of rotation of a work shaft with the use of linear movement of a piston in a cylinder and a crank mechanism connected with it, as disclosed for example in The New York Times, Oct. 13, 1991, and The New York Times, Apr. 21, 1993. In this internal combustion engine at the moment of maximum pressure of hot gases, the piston with the crank mechanism is located in the upper dead point. In this position at the maximum temperature of hot gases, there is no conversion of heat energy into mechanical energy of movement in the combustion chamber since the lever arm of the crankshaft is equal to zero and therefore the torque on the work shaft is equal to zero. At this moment there is the maximum jump of temperature between hot gas in the combustion chamber and a cylinder block surrounding the same. A substantial part of the thermal energy is transmitted to the cylinder block and is discharged into atmosphere through water cooling. This causes low energy efficiency of known internal combustion engines.

This can be also proven from the thermodynamic point of view since in the above described case the polytrope is far from an ideal one, and the area inside the polytrope is small. In other words, the useful energy taken for the mechanical movement is low. After this, when the crankshaft turns by 90° and the lever arm becomes maximal, the gas pressure above the piston is small as compared with the maximum pressure and as a result the torque is also small. Therefore, in the known system with the high gas pressure applied to the piston there is no substantial lever arm, and when there is a lever arm the gas pressure applied to the piston is small. In such a system the conversion of thermal energy into mechanical energy of rotation of work shaft is carried out inefficiently. Moreover, the utilization of the crank mechanism for direct conversion of linear movement of the piston system directly into the rotary movement of the work shaft due to the upper dead point limits the value of specific pressure. In this system at the moment of fuel combustion the piston with the crankshaft is in the upper dead point, the lever arm is qual to zero, the torque of the shaft is equal to zero, and the total pressure applied to the piston is used for impact through the pin and the connecting rod against the crankshaft and to the bearings which support the connecting rod and the connecting shaft. The utilization of high pressure P2 in this case requires stronger moveable parts of the engine, greater bearings, crankshaft and therefore the increase of size and weight of the engine as a whole. This in turn leads to heavier engines and worsening of its compact construction. In order to reduce the impact against the bearings of a crankshaft to some extent it is necessary to shift the time between the position of the piston in the upper dead point and the moment of fuel combustion (delay) in order to produce a torque of the work shaft which is not equal to zero. However, it does not provide a substantial improvement. This leads to additional energy losses, which reduces energy efficiency of the engine.

SUMMARY OF THE INVENTION

Accordingly, it is an object of the present invention to increase energy efficiency of the engine, its power per weight unit, its reliability and working resource of the system.

In keeping with these objects and with others which will become apparent hereinafter, one feature of the present invention resides, briefly stated, in an internal combustion engine which is formed so that the combustion pressure in the respective cylinder is transmitted to the piston of the engine the moment when a maximum combustion pressure is produced in a combustion chamber and a maximum distance of a center of a crank from its rotary axis is provided, so that a maximum torque is produced on the work shaft. The transmission of pressure is performed through a stock and a traction rod as well as connecting rods connected with it to a trunion of a crank and through gears to the work shaft of the engine.

This approach is a new way of conversion of thermal energy into mechanical energy of rotation of work shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The present invention is illustrated as an example of a two-cycle internal combustion engine.

Figure 1:
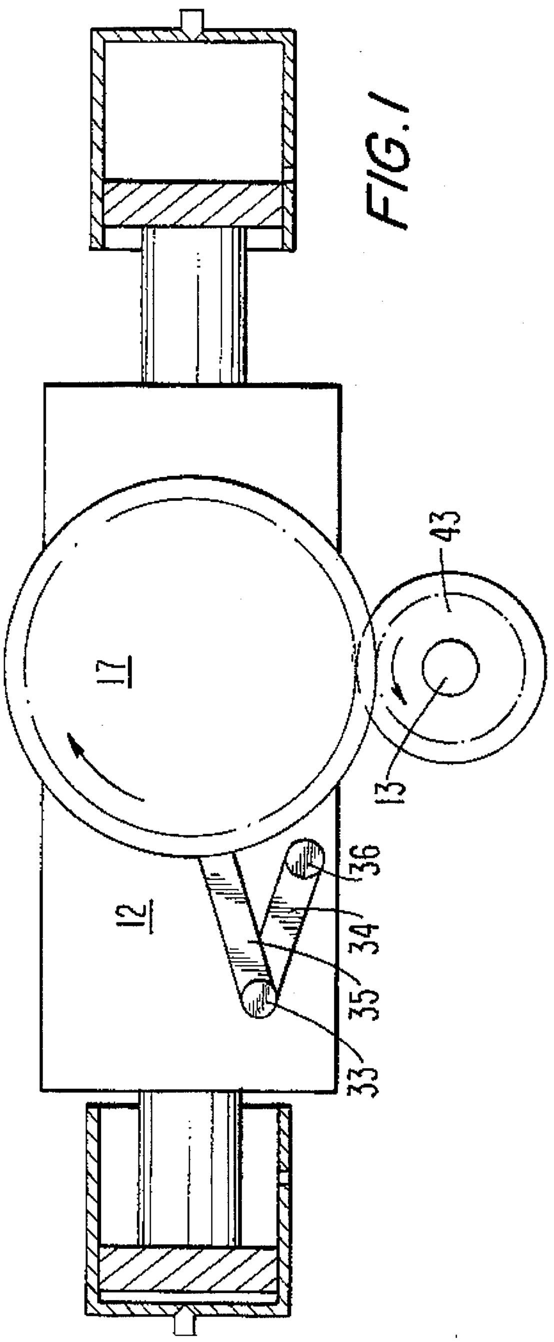
FIG. 1 is a front view of an internal combustion engine in accordance with the present invention.
Figure 2:
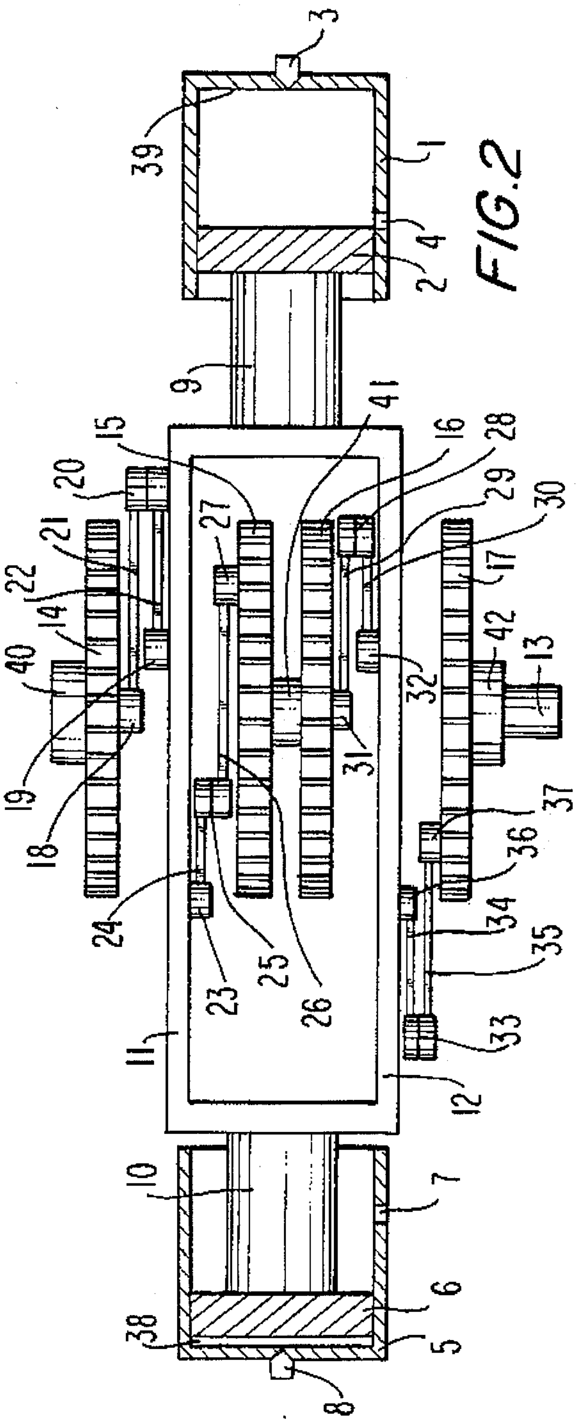
FIG. 2 is a top view of the inventive internal combustion engine.

As can be seen from FIG. 2 at the right side, a cylinder 1 has a piston 2. A nozzle 3 for injection of fuel is arranged in the cover of the cylinder 1 and a window 4 is provided for expulsion of exhaust gases and intake of air. At the left side of FIG. 1, a second cylinder 4 with a piston 6 is shown. A nozzle 8 is arranged on the cover of the cylinder 5 for injection of fuel and a window 7 is provided for expulsion of exhaust gases and intake of air. The work pistons 2 and 6 are connected with one another by rigid stocks 9 and 10 and traction rods 11 and 12 so that the pistons 2 and 6 are arranged correspondingly in the cylinders 1 and 5 and form a double-acting piston. The stocks 9 and 10 are rigidly connected with the traction rods 11 and 12. The traction rod 11 passes between gears 14 and 15, while the traction rod passes between the gears 16 and 17.

The traction rod 11 at the one side at the top carries a hinge 19 and at the other side at the bottom carries a hinge 23. The traction rod 12 at the one side at the top carries a hinge 32 and at the other side at the bottom carries a hinge 36. The upper hinge 19 of the traction rod 11 is connected with a crank 18 located on the gear 14 through a pushing connecting rod 22 and a pulling connecting rod 21. The connecting rods 21 and 22 are connected with one another by hinge 20. The lower hinge 23 located at the opposite side of the traction rod 11 is connected with the crank 27 located on the gear 15 through a pushing connecting rod 24 and a pulling connecting rod 26. The connecting rods 24 and 26 are connected with one another by a hinge 25. Correspondingly, an upper hinge 32 of the traction rod 12 is connected with a crank 31 located on the gear 16 through a pushing connecting rod 30 and a pulling connecting rod 29. The connecting rods 29 and 30 are connected with one another by a hinge 28. A lower hinge 36 located at the opposite side of the traction rod 12 is connected with the crank 37 located on the gear 17 through a pushing connecting rod 34 and a pulling connecting rod 35. The connecting rods 34 and 35 are connected with one another by a hinge 33. The gear 14 rotates on a shaft 40, the gears 15 and 16 rotate on a shaft 41, and the gear 16 rotates on a shaft 42. The gears 14, 15, 16 and 17 are connected with one another through a gear 43 which rotates together with the work shaft 13 fixedly connected with it. The gears 14, 15, 16, 17 have identical radii. The radius of the gear 43 is several times smaller than the radii of the gears 14, 15, 16, 17. The trunions of the cranks 18, 27, 31 and 37 correspondingly on the gears 14, 15, 16, 17 are offset relative to one another by 90° in direction of rotation of the gears. A combustion chamber 38 is provided in the cylinder 5, and a combustion chamber 39 is provided with a cylinder 1.

The conversion of thermal energy into mechanical energy of a rotary movement of a work shaft of an internal combustion engine with new cycles is performed in the following manner.

Figure 3A:
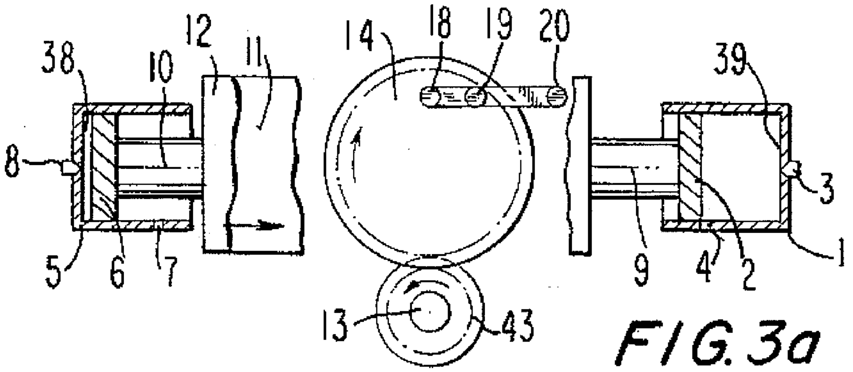
FIGS. 3*a*–3*d*, 4*a*–4*d*, 5*a*–5*d* are views showing a position of the crank mechanism at the beginning of a first cycle and at the end of a fourth cycle.
Figure 3B:
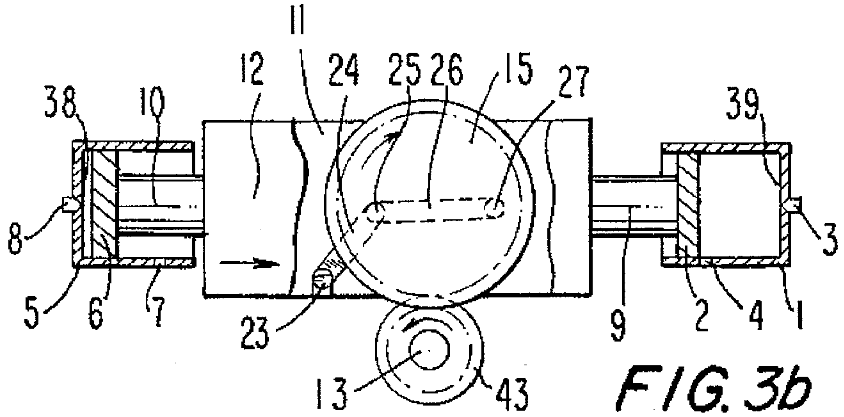
Figure 3C:
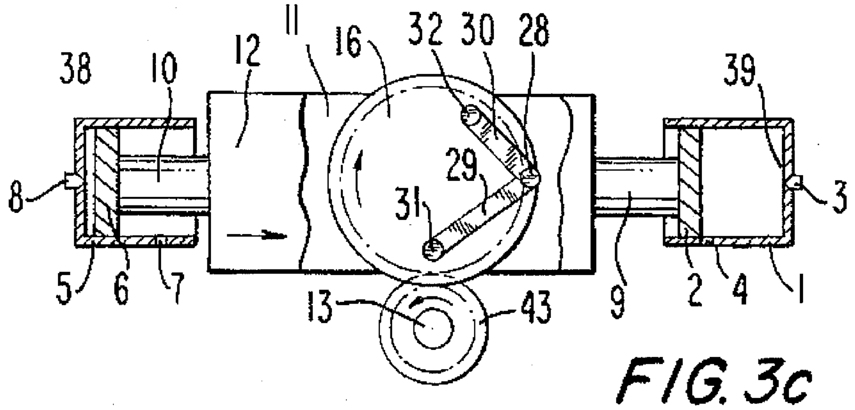
Figure 6A:
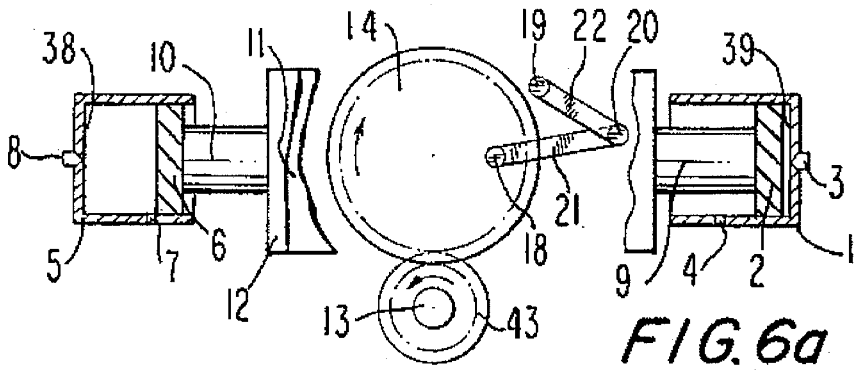
FIGS. 6*a*–6*d* are views showing a position of the crank mechanism at the beginning of the second cycle.
Figure 6B:
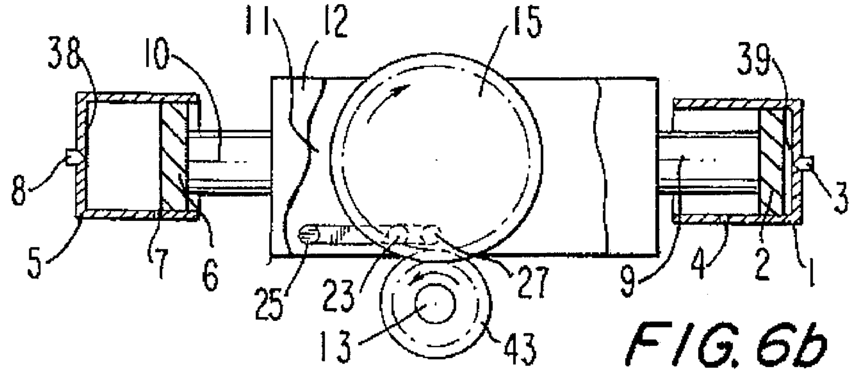
Figure 6C:
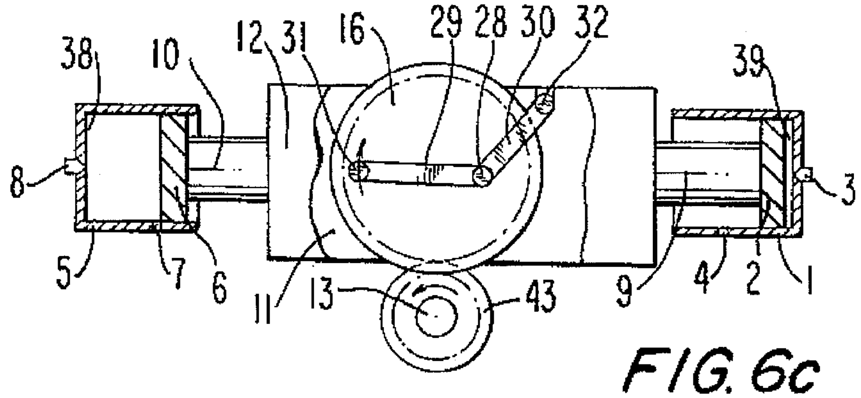
Figure 6D:
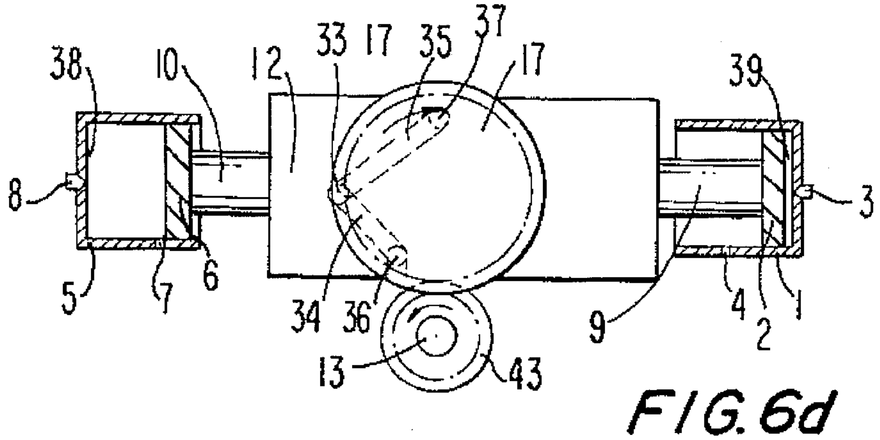

Cycle 1. During combustion of fuel in the combustion chamber 31 in which preliminary air was compressed, during rotation of the work shaft 13 from a not shown starter, a maximum pressure Pz applied to the piston 6 is generated. Under the action of this pressure, the piston 6 starts its working stroke from the left to the right and through the stock 10 transmits a force to the fixedly connected traction rod 11 and simultaneously to the traction rod 12. As shown in FIG. 3*a*, at this moment on the gear 14 the trunion of the crank 18 is located at the top near the hinge 19 of the traction rod 11. The connecting rods 21 and 22 connected with the trunion of the crank 18 and hinge 19 of the traction rod 11 are superposed and extend along a single horizontal straight line. The generated maximum pressure applied to the piston 6 is transmitted through the hinge 19 and the connecting rods 21 and 22 connected with one another by a hinge 20 to the trunion of the crank 18. The pressure Pz applied to the piston is transmitted to the trunion of the crank 18 perpendicular to the radius of its rotation, in other words when the lever arm of the crank has its maximum magnitude or a distance from the center of the crank to its axis of rotation is maximal. The force is transmitted along a tangent to the circle, along which the trunion 18 moves. As a result, there is a combination of the maximum pressure applied to the piston 6 and correspondingly a maximum force applied to the traction rod 11 and therefore to the trunion 18, with the maximum lever arm of the crank 18. Thereby optimal conditions are created for producing a maximum torque on the gear 14, which is transmitted to the gear 43 connected with it and correspondingly to the work shaft 13. Simultaneously with the expansion of hot gases in the chamber 38, a compression of air in the chamber 30 is performed through the stock 10, traction rods 11 and 12, and through a stock 9 by the piston 2. The gears 14, 15, 16, 17 which have identical radii and are connected with the gear 43 are rotated synchronously. When the working stroke of the piston 6 ends, the gear 14 with the trunion of the crank 18 turns by 90° (FIG. 6*a*) and due to the synchronism of rotation all other gears 15, 16, 17 also turn by 90° as shown in FIGS. 6*b*–6*d*. The stroke of the piston 6 is equal to the radius of rotation of the trunion of the crank 18. Therefore when the trunion of the crank 18 together with the gear 14 turns by 90° and the trunion 18 moves to the right by its radius of rotation, the piston 6 moves from the left to the right by the same radius. All other connecting rods 24, 26, 29, 30, 34 and 35 perform preparatory cycles, they move freely and do not interfere with the working stroke of the connecting rods 22 and 21. The connecting rods 24 and 25 connected with the trunion of the crank 27 turn together with the hinge 19 and tend to superpose and extend in a single line. When all cranks simultaneously turn by 90°, the trunion of the crank 27 is located underneath near the hinge 23 of the traction rod 11. The connecting rods 24 and 26 are superposed in a single line and located along one horizontal straight line as shown in FIG. 6*b*. Therefore favorable conditions are created for producing a maximum lever arm during action of maximal force through the traction rod 11 on the hinge 23.

Cycle 2. At this moment of time, the compression of air in the chamber 39 ends. Air temperature increases so that during injection of fuel into the chamber 39 through the nozzle 3 a self-combustion of fuel occurs and the gas pressure sharply increases. The maximum pressure Pz is generated above the piston 2. Under the action of this pressure the working stroke of the piston 2 starts in an opposite direction from the right to the left, and through the stock 9 the piston transfers the force to the fixedly connected traction rod 11 and simultaneously to the traction rod 12. As shown in FIG. 6*b* at this moment on the gear 15 the trunion of the crank 27 is located underneath near the hinge 23 of the traction rod 11. The connecting rods 24 and 25 connected with the trunion of the crank 27 and the hinge 23 of the traction rod 11 are superposed and extend along one horizontal straight line. The generated maximum pressure on the piston 2 is transmitted by the traction rod 11 through the hinge 23 and the connecting rods 24 and 26 connected with one another by the hinge 25 to the trunion of the crank 27. The pressure Pz applied to the piston 2 is transmitted to the trunion of the crank 27 perpendicular to the radius of its rotation, or in other words when the lever arm of the crank has its maximum magnitude. The force is transmitted along a tangent to the circle along which the trunion 27 moves. As a result, there is a combination of maximum pressure on the piston 2 and correspondingly maximum force at the traction rod 11 and as a result at the trunion 27, with the maximum lever arm of the crank shift 27. Thereby optimal conditions are created for producing a maximum torque on the gear 15, which is transmitted to the gear 43 connected with it and correspondingly to the work shaft 13.

Figure 7A:
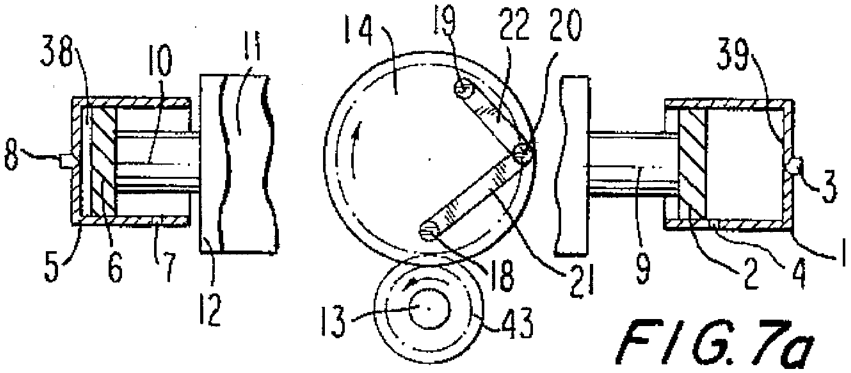
FIGS. 7*a*–7*d* are views showing a position of the crank mechanism at the beginning of the third cycle.
Figure 7B:
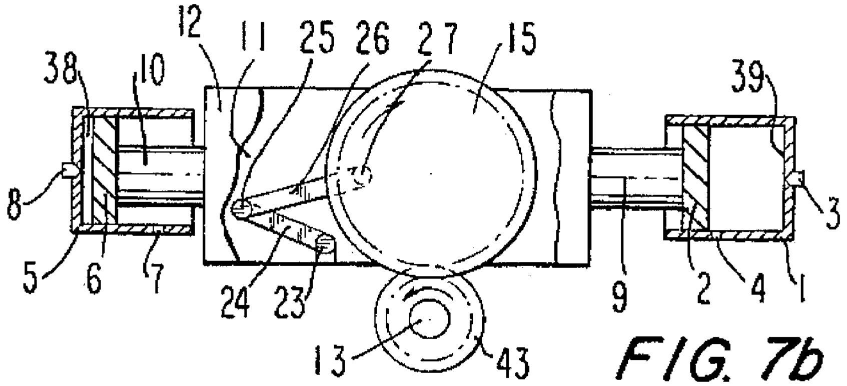

Simultaneously with expansion of hot gases in the chamber 39, air is compressed in the chamber 38 through the stock 9, traction rods 11 and 12 through the stock 10 by the piston 6. The gears 14, 15, 16, and 17 which have identical radii and are connected with the gear 43 rotate synchronously. At the end of the working stroke of the piston 2, the gear 15 with the trunion of the crank 27 turns by 90° as shown in FIG. 7*a,* and as a whole from the beginning of work and upon finishing of the cycle 2 all gears 14, 15, 16, 17 which rotate synchronously turn each by 180°(FIGS. 7*a*–7*d*). The gear 43 connected with them and correspondingly the work shaft 13 turned by an angle which is many times greater as the ratio of the gears 14, 15, 16, 17 is greater relative to the gear 43.

Since the connecting rods are composed of two parts including a pushing connecting rod and a pulling connecting rod which are connected with one another by a hinge, during a working stroke of one pair of the connecting rods 24 and 26 the remaining connecting rods 21, 22, 29, 30, 34, 35 freely perform preparatory cycles. The connecting rods 29 and 30 connected with the trunion of the crank 31 turn together with the hinge 28 and tend to superpose and extend along one line. When all gears with the crank simultaneously turn by 90° the trunion of the crank 31 is located above near the hinge 32 of the traction rods 12. The connecting rods 29 and 30 are superimposed and extend along one horizontal line as shown in FIG. 4. Thereby favorable conditions are created for producing a maximum lever arm with a simultaneous action of maximum force through the traction rod 12 on the hinge 32.

Figure 7C:
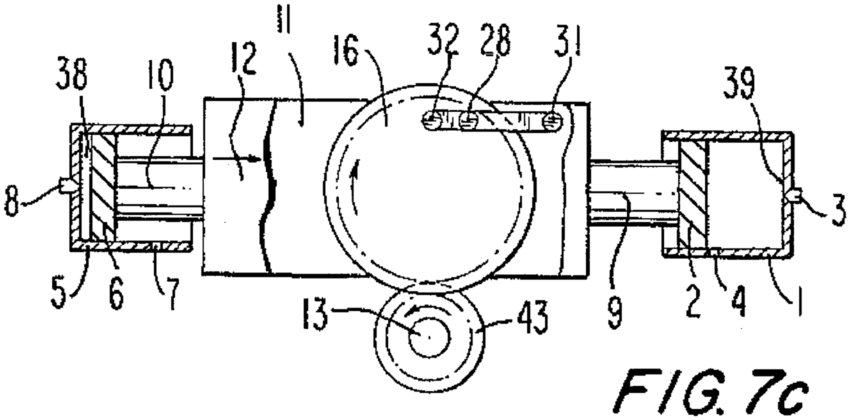
Figure 7D:
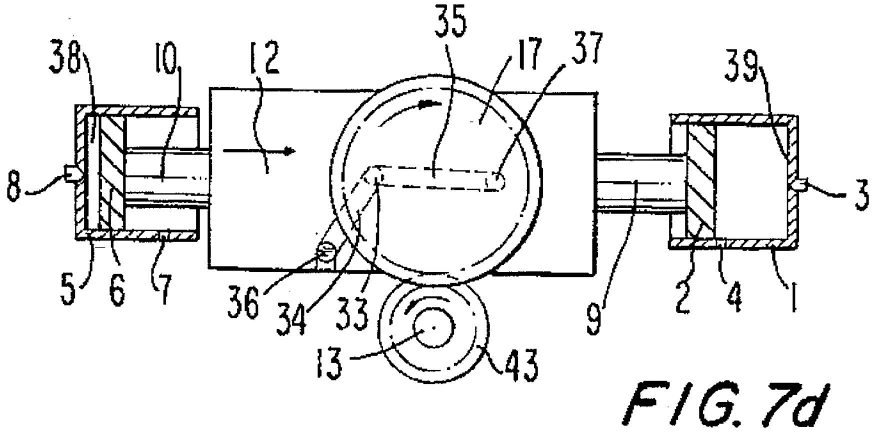
Figure 8A:
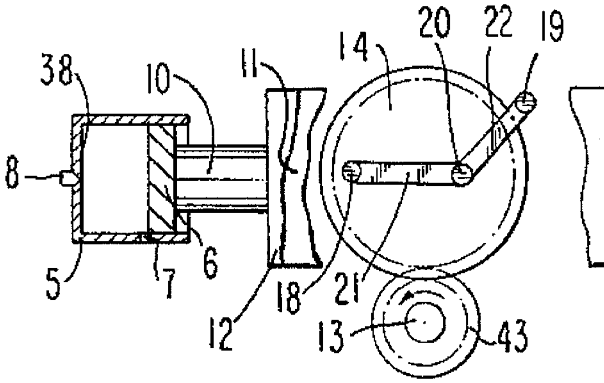
FIGS. 8*a*–8*d*are views of a position of a crank mechanism at the beginning of the fourth cycle.
Figure 8B:
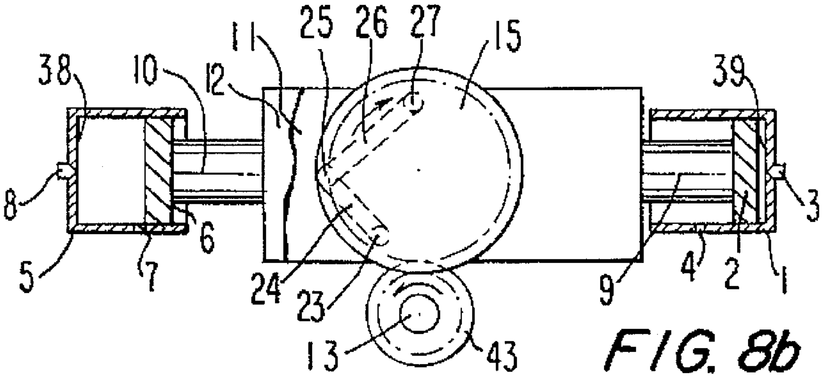
Figure 8C:
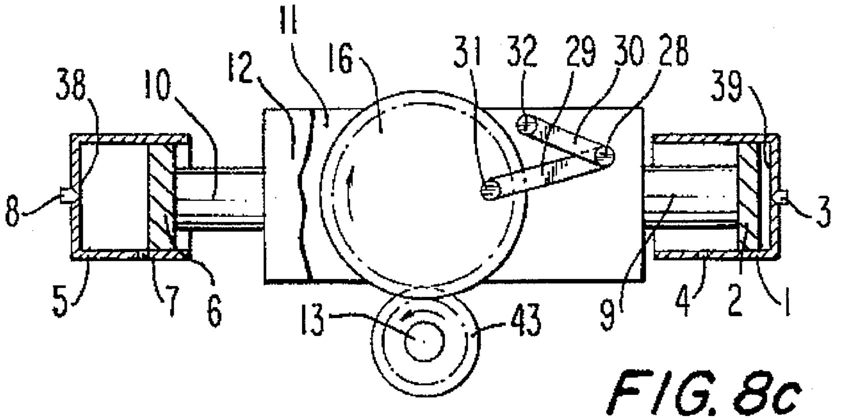
Figure 8D:
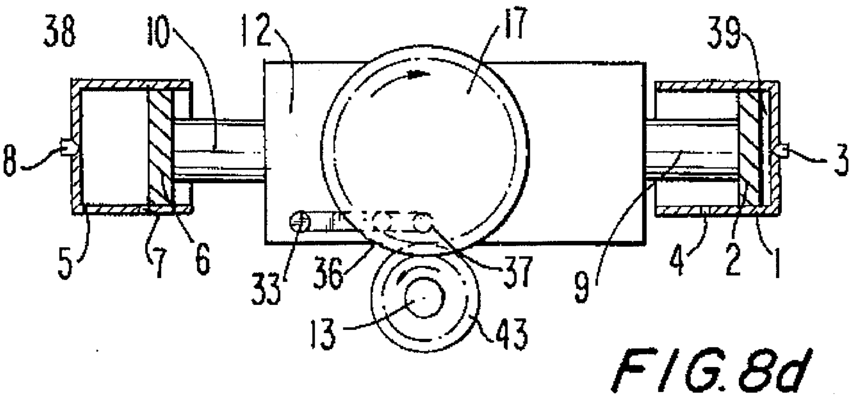

Cycle 3. At this moment the compression of air in the chamber 38 ends. The temperature increases so that during injection of fuel into the chamber 38 through the nozzle 8 self-firing of fuel occurs and the gas pressure sharply increases. A maximum pressure Pz is formed above the piston 6. Under the action of this pressure working stroke of piston 6 starts in the opposite direction from the left to the right and through the stock 10 transmits the force to the fixedly connected traction rod 12 and simultaneously to the traction rod 11. As shown in FIG. 7*c* at this moment on the gear 16 the trunion of the crank 31 is located above near the hinge 32 of the traction rod 12. The connecting rods 29 and 30 are connected with the trunion of the crank 31 and the hinge 32 of the traction rod 12, they are superposed and extend along one horizontal straight line. The generated maximum pressure on the piston 6 is transmitted by the traction rod 12 through the hinge 32 and the connecting rods 29 and 30 connected with one another by the hinge 28, to the pinion of the crank 31. The pressure Pz on the piston 6 is transmitted to the trunion of the crank 31 perpendicular to the radius of its rotation or in other words when the lever arm of the crank has a maximum magnitude. The force is transmitted along the tangent to the circle along which the trunion 31 moves. As a result there is a combination of the maximum pressure on the piston 6 and correspondingly the maximum force on the traction rod 12, and as a result on the trunion 31, with the maximal lever arm of the crank 31. Therefore optimal conditions are created for producing the maximum torque on the gear 16, which is transmitted to the gear 43 connected with it and correspondingly to the work shaft 13. Simultaneously with expansion of hot gases in the chamber 38, the air compression is performed in the chamber 39 through the stock 10, the traction rods 11 and 12, through the stock 9 by the piston 2. The gears 14, 15, 16, 17 have identical radii and are connected with the gear 43, and they rotate synchronously. At the end of the working stroke of the piston 6, the gear 16 with the trunion of the crank 31 turns by 90° as shown in FIG. 8*c* and as a whole from the beginning of the work at the end of the cycle 3 all gears 14, 15, 16 and 17 which rotate synchronously turn each by 270°(FIGS. 8*a*–8*d*). The gear 43 connected with them and correspondingly the work shaft 13 turns by the angle which is as many times greater as the ratio of the gears 14, 15, 16 and 17 is greater relative to the gear 43. Since the connecting rods are composed of two parts, in particular a pushing connecting rod and a pulling connecting rod, and are connected with one another by the hinge, therefore during the working stroke of one pair of the connecting rods 29 and 30 the remaining connecting rods 21, 22, 24, 26, 34, 35 freely perform preparatory cycles. The connecting rods 34 and 35 connected with the trunion of the crank 36 turn together with the hinge 33 and tend to superimpose and be located in one line. When all gears with the cranks simultaneously turned by 90°, the trunion of the crank 37 is located below near the hinge 36 of the traction rod 12. The connecting rod 34 and 35 superimpose and are located along a single horizontal straight line as shown in FIG. 8*d*. Therefore favorable conditions are created for producing the maximum lever arm with the action of maximum force through the traction rod 12 on the hinge 36.

Figure 3D:
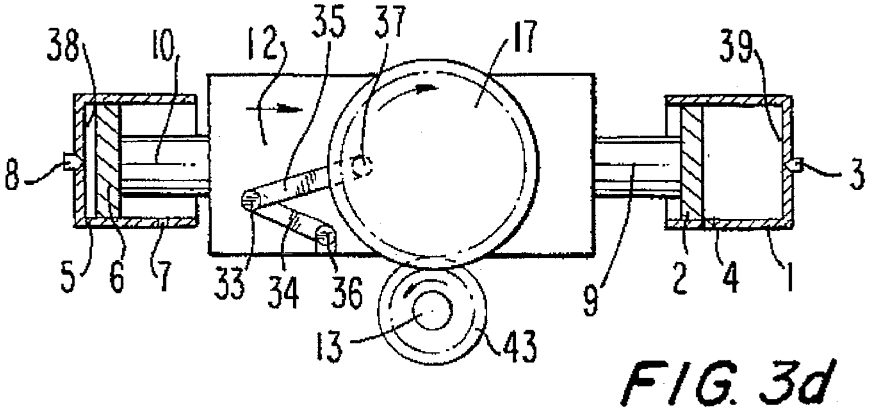
Figure 4A:
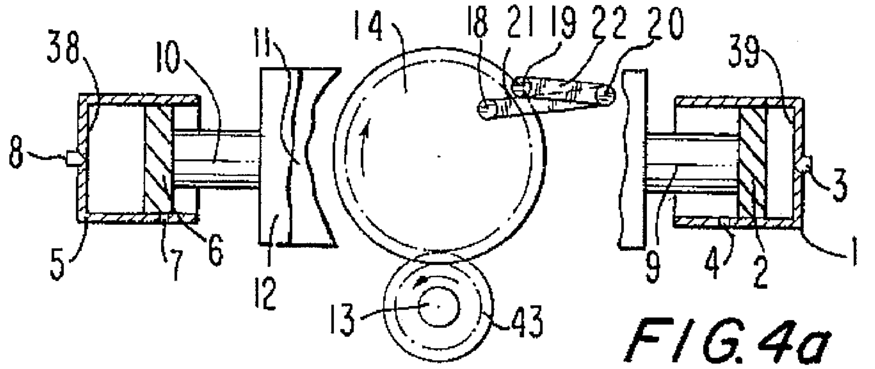
Figure 4B:
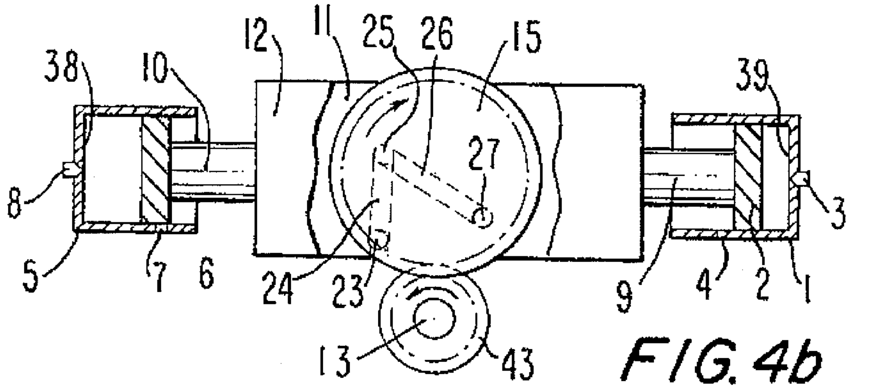
Figure 4C:
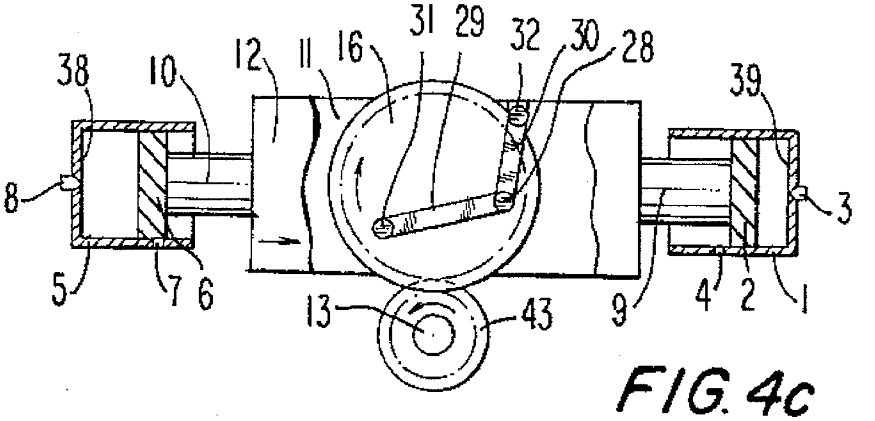
Figure 4D:
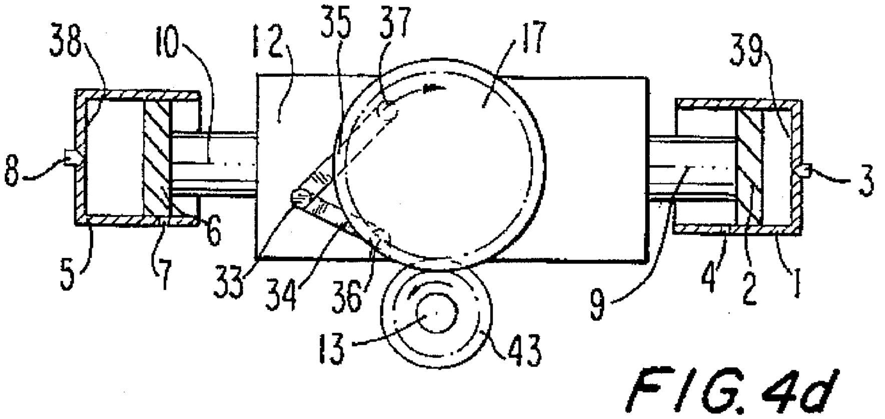
Figure 5A:
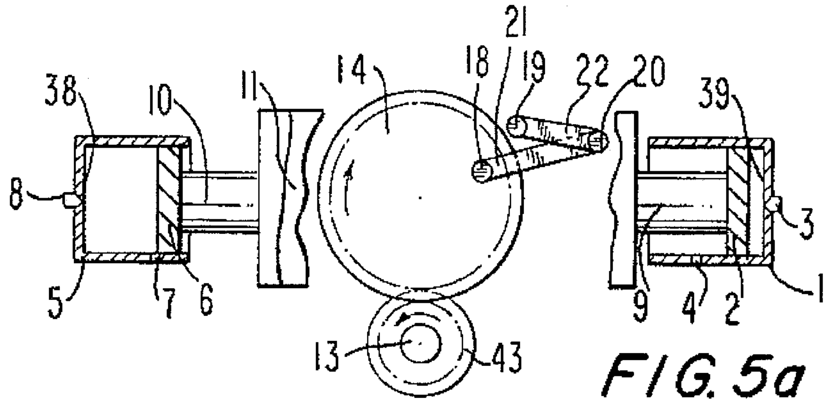
Figure 5B:
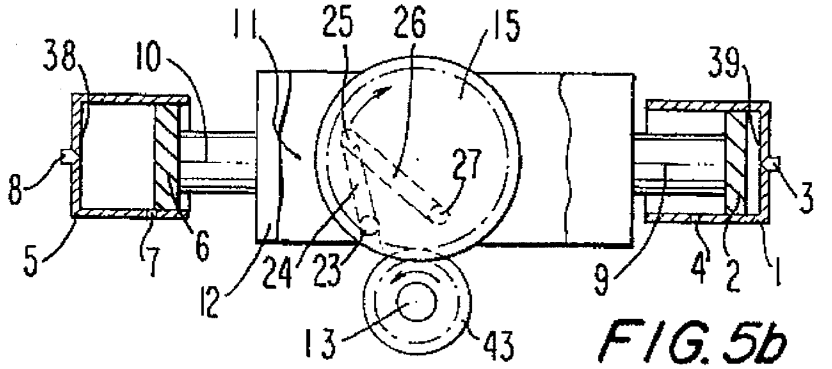
Figure 5C:
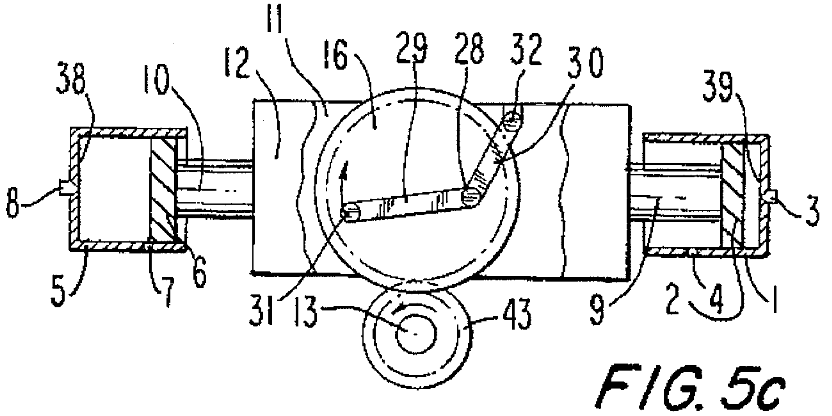
Figure 5D:
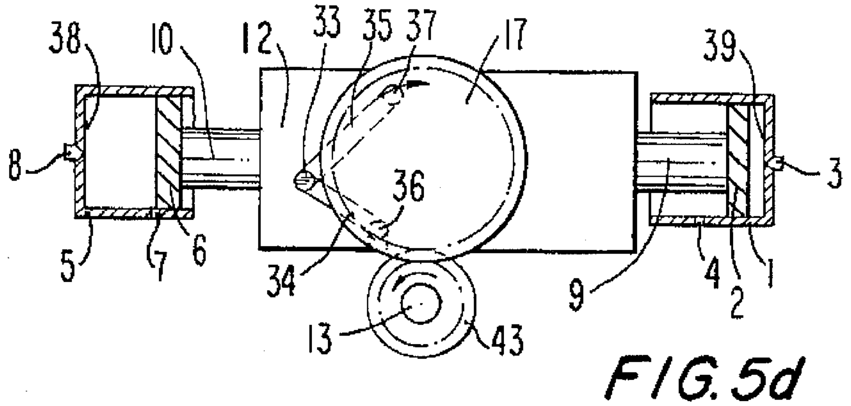

Cycle 4. At this moment the compression of air ends in the chamber 39. The air temperature increases so that during injection of fuel into the chamber 39 through the nozzle 3 self-firing of fuel occurs and the gas pressure sharply increases. The maximum pressure Pz is formed above the piston 2. Under the action of this pressure the working stroke of the piston 2 starts in the opposite direction from the right to the left, and through the stock 9 transmits force to the fixedly connected traction rod 12 and simultaneously to the traction rod 11. As shown in FIG. 8*d,* at this moment on the gear 17 the trunion of the crank 37 is located below or near the hinge 36 of the traction rod 12. The connecting rod 34 and 35 connected with the trunion of the crank 37 and hinge 36 of the traction rod 12 are superposed and located along one horizontal straight line. The produced maximum pressure on the piston 2 is transmitted by the traction rod 12 through the hinge 36 and the connecting rods 34 and 35 connect with one another by the hinge 33 to the trunion of the crank 37. The pressure Pz on the piston 2 is transmitted to the trunion of the crank 37 perpendicular to the radius of its rotation or in other words when lever arm of the crank has its maximum magnitude. The force is transmitted along a tangent to the circle along which the trunion 37 moves. As a result, there is a combination of the maximum pressure on the piston 2 and correspondingly maximum force on the traction rod 12 and as a result on the trunion 37, with the maximum lever arm of the crank 37. Therefore, again optimal conditions are created for producing maximal torque on the gear 17, which is transmitted to the gear 43 connected with it and correspondingly to the work shaft 13. Simultaneously with the expansion of hot gases in the chamber 39, air is compressed in the chamber 38 through the stock 9, traction rods 11 and 12, through the stock 10 by the piston 6. The gears 14, 15, 16, 17 have identical radii and are connected with the gear 43, and they rotate synchronously. At the end of the working stroke of the piston 2, the gear 17 with the trunion of the crank 37 turns by 90° as shown in FIG. 3*d,* and as a whole from the beginning of work at the end of the fourth cycle all gears 14, 15, 16, 17 which turn synchronously, turn each by 360°. In other words, they perform a full revolution. The gear 43 connected with them and correspondingly the work shaft 13 turned by the angle which is as many times greater in other words perform as many revolutions, as the ratio of gears 14, 15, 16 and 17 is greater relative to the gear 43.

Since the connecting rods are composed of two parts which include a pushing connecting rod and a pulling connecting rod connected with one another by a hinge, therefore during a working stroke of one pair of the connecting rod 34, 35, the remaining connecting rods 21, 22, 24, 26, 29, 30 freely perform preparatory cycles. The connecting rods 21 and 22 connected with the trunion of the crank 18 turn together with the hinge 20 and tend to superpose in a single line. When all gears with the cranks simultaneously turned by 90°, the trunion of the crank 18 is located above near the hinge 19 of the traction rod 11. The connecting rods 21 and 22 superpose in a single line and are located along one horizontal straight line as shown in FIG. 2. Therefore, favorable conditions are created for obtaining a maximal lever arm with the action of maximal force through the traction rod 11 on the hinge 19. Thereby when the gears 14, 15, 16, 17 complete the full revolution, the process starts from the cycle 1.

In FIGS. **4*a*–4*d*, for the cycle I, intermediate position of a mechanism is shown during turning of the cranks 18, 27, 31 and 37 arranged on the gears 14, 15, 16, 17, by 45°. FIGS. 5*a*–5*d* shows, for the cycle I, intermediate position of the mechanism during the turning of the cranks 18, 27, 31, 37 arranged on the gears 14, 16, 17, by 67.5°. Therefore with the example of the cycle I three positions of the cranks are shown: in the beginning of the cycle for 0° in FIGS. 3*a*–3*d*, during turning by 45° in FIGS. 4*a*–4*d*, during by 67.5° in FIGS. 5*a*–5*d* and the cycle I ends during turning of the cranks 18, 27, 31, 37, by 90°. Then cycle II shown in FIGS. 6*a*–6*d* starts. Cycle II ends during turning of the cranks by 180° and cycle III starts. The position of the mechanism in the beginning of cycle III is shown in FIGS. 7*a*–7*d*. Cycle III ends during turning of the cranks 18, 27, 31, 37 and correspondingly gears 14, 15, 16, 17 by 270°, and cycle IV starts. FIGS. 8*a*–8*d* shows the position of the mechanism in the beginning of cycle IV which ends with turning of the cranks 18, 27, 31, 37 arranged on the gears 14, 15, 16, 17 by 330°. And then the process is repeated again. Thus during each cycle the gears, 14, 15, 16, 17**, turn by 90°.

All connecting rods successively perform the working stroke in pairs through which one-fourth revolution of the gears. The optimal working mode of the internal combustion engine takes place during each cycle, or in other words, during each stroke of the piston, therefore through each one-fourth revolution of the gears 14, 15, 16, 17 there is a combination of the maximal gas pressure on the piston and the maximum lever arm of the crank of the corresponding trunion, or in other words, a maximal torque is produced.

With a great ratio of the gears 14, 15, 16, 17 relative to the gear 43, the work shaft during the maximal torque on the driving gears performs greater number of revolutions. Thereby a uniform transmission of maximal torque is performed to the work shaft. In conventional internal combustion engines for this purpose it would be necessary to use a greater number of cylinders such as eight, while in the new engine there are only two cylinders.

The working energy efficiency of the internal combustion engine is $\mu$=65%.

The method in accordance with the present invention has many advantages. First of all, the efficiency of conversion of thermal energy into mechanical energy of rotation of the working shaft is substantially increased. The engine has a high efficiency as a result of performing of new cycles. The use of the new cycles makes possible to obtain a combination of the maximal pressure in the combustion chamber with the maximal lever arm of the crank, and as a result to obtain a greater torque on the work shaft which is at least double of the torque of conventional internal combustion engines with the same initial parameters, or in other words with the same cylinder volume and the same initial pressure in the combustion chamber. The fuel consumption in the inventive internal combustion engine is substantially reduced as a result of the high energy efficiency due to the highly efficient thermodynamic cycle. In the inventive internal combustion engine, averaging of the maximal torque on the work shaft is performed since it performs greater number of revolutions per time of the single piston stroke. The inventive internal combustion engine does not need water cooling. The internal combustion engine does not have a system of tappets and a distribution system for them. The manufacture of the internal combustion engine is simplified and the metal consumption is reduced, and as a result, the manufacture is less expensive. Due to the performance of new cycles, there are no dead points of the work shaft, and therefore during the maximum pressure the conditions are created above the piston when the free unlimited work stroke of the piston determines the movement of the crank. As a result, the thermodynamic cycle which is close to an ideal cycle is utilized. Therefore, the new internal combustion engine as thermo-power plant has a high efficiency and an energy efficiency of 65%. In the conventional engines in view of the presence of the upper dead point of the shaft and the crankshaft mechanism connected with it, the movement of the crank determines the movement of the piston. In the conventional engine there are polytropic processes which are far from ideal, and as a result significant part of the thermal energy is lost through the water cooling and radiator to atmosphere, so that the energy efficiency is only half of the energy efficiency of the inventive internal combustion engine. In the new engine there are no impacts against the work shaft and the bearings and also moving parts. This substantially reduces the requirements to the strength of the movable parts of the engine and bearings so that the size of the work shaft, bearings, cylinder diameters and the whole engine can be reduced. In the proposed system there are no limits for the magnitude of specific pressure above the piston P2. Due to the use of great magnitudes of the gas pressure on the piston Pz it is possible to obtain higher torques with small piston diameters and to produce higher power of the engine with smaller sizes. The rotatable gears simultaneously form flywheels with a great moment of inertia, which contributes to the creation of stable torque on the work shaft with the non-uniform pressure on the piston during its working stroke. The use of the gears-flywheels with a high reserve of torque allows the provide a greater degree of compression with reducing a gas pressure above the working piston at the end of the working stroke. The increased compression degree due to the rotary energy of the gear-flywheels is possible for exhaust of work gases at relatively low temperature which leads to greater efficiency coefficients. The greater ratio between the driving and driven gears is possible, with a low torque provided by a starter on the work shaft, to produce great torque on the crank and therefore it is easy to achieve a greater degree of compression during engine start so as to obtain a reliable engine start even at low temperatures. The inventive internal combustion engine provides increase of power per weight unit, increase in reliability and working resource of the system, when compared with conventional engines.

I claim:

1. An internal combustion engine, comprising a rotatable work shaft; a rotatable crank connected with said work shaft; a plurality of cylinders having working chambers; a plurality of pistons movable in said cylinders; and connecting means connecting said pistons with said crank so that a maximum compression pressure in said respective cylinders is transmitted to said crank and a maximum lever arm of said crank is simultaneously obtained.

2. An internal combustion engine as defined in claim 1; and further comprising gears connecting said crankshaft with said work shaft and formed as flywheels.

3. An internal combustion engine as defined in claim 2, wherein said gears include a driving gear and a driven gear arranged so that a torque of each of said driving gears is transferred to said driven gears arranged on said working shaft.

4. An internal combustion engine as defined in claim 1, wherein said connecting means includes a pushing connecting rod and a pulling connecting rod connected with one another by a hinge.

5. An internal combustion engine as defined in claim 4, wherein said connecting means include a plurality of such pushing rods and pulling rods arranged so that when one pair of said connecting rods including one pushing rod and one pulling rod perform a working stroke, the remaining connecting rods freely perform preparatory cycles.

6. An internal combustion engine as defined in claim 4, wherein said connecting rods are formed so that each pair of said connecting rods perform a working stroke over each one fourth revolution of a driving gear to which a force is transmitted.

7. An internal combustion engine as defined in claim 4, wherein said pushing and said pulling gears are superposed during a working cycle located along a single line so that a maximum force is transmitted along a tangent to a circle along which a trunion of said crank moves.

* * * * *